UNITED STATES PATENT OFFICE.

FREDERICK RICHARD BACHLER, OF LOS ANGELES, CALIFORNIA, ASSIGNOR TO KIESELGUHR COMPANY OF AMERICA, OF LOS ANGELES, CALIFORNIA, A CORPORATION OF CALIFORNIA.

PROCESS OF PURIFYING LIQUIDS.

1,170,868.  Specification of Letters Patent.  Patented Feb. 8, 1916.

No Drawing.  Application filed March 1, 1915. Serial No. 11,150.

*To all whom it may concern:*

Be it known that I, FREDERICK RICHARD BACHLER, a subject of the Emperor of Austria-Hungary, residing at Los Angeles, in the county of Los Angeles and State of California, have invented a new and useful Process of Purifying Liquids, of which the following is a specification.

This invention relates to a process for the removal from liquids, of impurities present therein, and the main object of the invention is to provide for removal of impurities which interfere with or retard filtration of liquids.

Another object of the invention is to provide for clarification and decolorization of liquids.

A further object of the invention is to remove or reduce viscosity or stickiness of the liquids, as an aid to crystallization.

I will hereinafter describe my invention in its particular application to the treatment of sugar solutions, with a view to aiding filtration, decolorization and reduction of viscosity, but it will be understood that the invention is of general application, to solutions, or liquids, containing substances, such as gummy or slimy matters, which interfere with the satisfactory treatment of the solution or liquid, in filtration, decantation, crystallization, or otherwise separating the constituents thereof.

This invention is based on the action, in such solutions or liquids, of a colloidal metallic compound or mineral colloid, such as colloidal clay, colloidal hydrous aluminum silicate, or aluminum hydrate, which is brought into a state of suspension in the solution or liquid, and is then precipitated by the action of a suitable coagulating agent, forming a flocculent precipitate which separates, from the solution or liquid, the dark colored gummy substance which it is desired to eliminate. In order to enable this clarifying operation to be carried out to advantage, I have found it generally desirable to use in connection therewith a substance which will prevent clogging of the filter during the subsequent filtration, by reason of the large amount of this precipitate and the gummy matter contained therein. For this purpose I may use any material capable of acting as a porous carrier for the precipitate, so as to maintain it in a porous, open condition, suitable for filtration, and I prefer to use kieselguhr as such porous carrier, by reason of its exceptional porosity and ability to maintain the openness of the precipitate.

As a colloidal metallic compound, or mineral colloid, I have used with satisfactory results, a colloidal clay or hydrous aluminum silicate, sufficiently colloidal to enable it to remain suspended in water for an indefinite time, when added to the water in the proportions required by the process, say in the proportion of one-tenth part of clay to one hundred parts of water. Any other suitable colloidal metallic compound or mineral colloid may, however, be used.

As a porous carrier I prefer to use kieselguhr, ground, or otherwise reduced to a state of suitably fine division. Any other suitable porous carrier may however be used, in some cases, for example, sawdust, sand or other solid inert material in a suitable state of division.

In order to facilitate the uniform and rapid introduction of the collodial metallic compound or mineral colloid and the porous carrier into the solution or liquid, I prefer to mix the colloidal metallic compound or mineral colloid and porous carrier together to form a uniform mixture suitable for use in carrying out my process. My composition for treatment of solutions may be made by grinding or reducing each of the stated constituents, namely the colloidal metallic compound or mineral colloid and the porous carrier, to a state of suitably fine division, and intimately mixing such divided materials to form a substantially uniform product. In case clay and kieselguhr are used as the ingredients of the composition, such composition may be composed of substantially equal parts of clay and kieselguhr.

I will describe my process as applied to the clarification of sugar solutions by the use of a composition of clay and kieselguhr, it being understood that in applying it to the clarification of other liquids, or with substitutes for either the clay or the kieselguhr, substantially the same course may be followed, with suitable changes as to proportions, temperature, etc., that may be required by the nature of the liquid being treated, or the nature of the colloidal material or its carrier.

The mixture of colloidal clay and kieselguhr is made into a thick cream by triturating it with a little water, and the resulting cream is then added to the sugar solution to be treated, and thoroughly mixed or incorporated therewith, the proportion of clay to solution being, for example, about one-tenth of one per cent., or more, according to the strength of the solution and the amount of impurities present. The clay on account of its colloidal nature, becomes suspended in the solution in particles of extreme fineness, and remains so suspended until precipitated by the action of a suitable coagulator or flocculator. The nature of the coagulating agent used may depend on the nature of the solution which is being treated. With cane sugar solution, I have obtained satisfactory results by the use of an organic colloid, for example, a protein emulsion or jelly, such as flaxseed or cottonseed meal, boiled with sufficient water to form a gelatinous fluid. This fluid is added to the solution containing the colloidal clay, sufficient emulsion being preferably used to precipitate substantially all of the clay as a flocculent precipitate. The solution is heated to a temperature of about 50 or 60 degrees centigrade during the precipitating operation. The flocculent precipitate so formed contains the kieselguhr together with the clay and with a considerable proportion of the impurities in the solution, which are carried down with the clay, such precipitated impurities including particularly the gummy matters which tend to interfere with filtration. These gummy matters as well as the finely divided clay are so held and supported by the kieselguhr, acting as a porous carrier, that the precipitate maintains an open porous condition which is well adapted filtration or decantation. The solution is then treated, by filtration, decantation, or both, so as to remove the precipitate therefrom. The porosity of the precipitate enables it to be removed with especial economy and advantage in filter presses, as the porosity of the filter-cake is maintained and the clogging of the filter cloths is reduced to a minimum. I have found that in this process, all, or substantially all, of the clay used in the process is precipitated, and that it carries down with it about 25 per cent. of the mineral matter (ash) present in the solution together with about 12 to 18 per cent. of the organic impurities present, and that the organic matters so removed are largely of a gummy nature and such as would interfere with filtration. As such organic matters are usually of a dark color, their removal produces a considerable decolorizing effect. The removal of these gummy matters also considerably reduces the viscosity of the solution and therefore aids the subsequent crystallization of sugar from the solution.

Instead of a colloid as a coagulating agent, I may, in some cases, use a crystalloid, for example, sulfate of alumina, alum, or phosphoric acid. Thus, in treating beet sugar solutions, phosphoric acid may be used to advantage, particularly where the colloidal metallic compound used contains small amounts of alkali, as I have found sometimes to be the case with the colloidal clay, the phosphoric acid serving to neutralize such alkali. In some cases silicate of soda may also be added to the colloidal metallic compound to increase its colloidal action, and an equivalent amount of phosphoric acid may then be added, so as to react with this silicate of soda, forming an alkali phosphate and precipitating silica in bulky form, which aids the precipitating action of the coagulated colloidal compound. The alkali phosphate so formed will set free lime, from salts that are formed from organic acids and the lime used in the usual operations, and such organic acids being often darkly colored, and of a colloidal nature, are brought down with the colloidal metallic compound in the coagulating action, thereby aiding in decolorization and the reduction of viscosity.

My invention is applicable to other liquids besides sugar solutions. For example, it may be used for purifying water for drinking purposes, for purifying vegetable or mineral oils, and in general for purifying any liquid containing a gummy matter or other substance which interferes with filtration. In applying the invention to such various uses, the nature of the colloidal metallic compound, the coagulating agent therefor, and the porous carrier material, may be varied in order to produce the best results, and the process may be otherwise varied in its several steps. For example, in some cases, the use of heat in the coagulating action may not be necessary.

While I prefer to carry out the process by adding the porous carrier along with the colloidal metallic compound or mineral colloid or before the precipitation of such compound by the coagulating agent, such porous carrier may, if desired, be added to the solution or liquid after the precipitation of the colloidal metallic compound or mineral colloid by the coagulating agent, said porous carrier being then mixed thoroughly with the precipitate preparatory to filtration.

What I claim is:

1. The process of purifying a liquid which consists in mixing therewith a colloidal metallic compound, precipitating such compound, together with impurities in the liquid, by the action of a coagulating agent, and incorporating with the solution, during the process, a porous carrier to produce an open precipitate.

2. The process of purifying liquids, which consists in mixing with such liquid, a mineral colloid together with a porous carrier material, adding a coagulating agent to the liquid to precipitate the mineral colloid together with impurities in the liquid and with the porous carrier material, and then removing the precipitate from the liquid.

3. The process of purifying liquids, which consists in mixing with the liquid, a mineral colloid together with a porous carrier material, heating the liquid and adding a coagulating agent to precipitate the colloidal metallic compound together with impurities in the liquid and with the porous carrier material, and then filtering the liquid.

4. The process of purifying sugar solutions which consists in mixing a colloidal material containing hydrous aluminum silicate with such solution, precipitating such colloidal material, together with impurities in the solution, by the action of a coagulating agent in the presence of heat, incorporating kieselguhr with the solution during the process to produce an open precipitate, and filtering such precipitate from the solution.

5. The process of purifying liquids, which consists in mixing with the liquid, colloidal clay together with kieselguhr, heating the liquid and adding a coagulating agent to precipitate the colloidal clay together with the impurities in the liquid and with the kieselguhr, and then removing the precipitate from the liquid.

6. The process of purifying liquids, which consists in mixing with the liquid, colloidal clay together with a porous carrier material, adding a coagulating agent to precipitate the colloidal clay together with impurities in the liquid and with the porous carrier material, and then removing the precipitate from the liquid.

In testimony whereof I have hereunto set my hand, at Habana, Cuba, this 21st day of January 1915.

FREDERICK RICHARD BACHLER.

Witnesses:
RAOUL F. WASHINGTON,
J. A. SPRINGER.